United States Patent Office 3,845,127
Patented Oct. 29, 1974

3,845,127
HYDRAZONES OF CARBONYL COMPOUNDS CONTAINING AN OMEGA ALKENE MOIETY
Abe Berger and Terry G. Selin, Schenectady, N.Y., assignors to General Electric Company
No Drawing. Original application Aug. 16, 1971, Ser. No. 172,293, now Patent No. 3,700,711. Divided and this application June 28, 1972, Ser. No. 267,100
Int. Cl. C07c 109/14
U.S. Cl. 260—566 B
1 Claim

ABSTRACT OF THE DISCLOSURE

A new class of silicone compounds of the formula, (1)
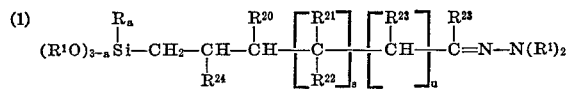

where R, $R^1$, $R^{20}$, $R^{21}$, $R^{22}$, $R^{23}$ and $R^{24}$ are independently selected from hydrogen and hydrocarbon radicals, $s$ varies from 0 to 1 and $u$ varies from 0 to 20, and $a$ is a whole number that varies from 0 to 2. These classes of compounds are particularly useful for flocculating colloidal organic matter.

This application is a division of copending application Ser. No. 172,293, filed Aug. 16, 1971 now Pat. No. 3,700,711.

BACKGROUND OF THE INVENTION

The present invention relates to silicone compounds and in particular the present invention relates to silicone compounds having hydrazone functional groups thereon.

Presently, a great effort is being made to purify sewage water and other types of waste water. During most such purification process there develops in the sewage or waste water stream colloidal suspensions of organic waste matter. Thus, in such purification process systems it is desirable to flocculate and precipitate the colloidal suspended matter. For such purposes there has been tried various types of flocculating agents. Such flocculents are categorized into four different classes such as colloidal hydroxide of polyvalent metals, hydroxides and the anionic, non-anionic and cationic polyelectrolite flocculating agents. It has been noted that cationic polyelectrolites are more efficient in flocculating colloidal organic waste matter than the other types of flocculating agents. However, as can be appreciated, the various cationic polyelectrolites vary in their efficiency for flocculating colloidal waste matter.

Silica sol or silicic acid has been found to be a flocculating agent for colloidal organic matter in sewage purification systems. However, the silica sol is not as efficient as would be desired. It has been desired to combine the silica sol with other systems and particularly it has been contemplated that silica sol could be combined with other compounds so as to result in a composition which is highly efficient as a flocculating agent for colloidal organic matter. In addition, there has been constant research into compounds which by themselves or in combination with other known compounds will increase the efficiency of the resulting composition as a flocculating agent for organic waste matter.

Up to the present time, there have been proposed several agents for bonding or sizing glass and glass types of material such as glass fibers so that different types of plastics would bond quite strongly to them. As is well known, certain types of glass type materials containing silica therein such as, glass fibers are widely used in the manufacture of various items such as, for instance, automobile tires. In such applications, it is highly desirable to apply a bonding agent to the glass fibers so that the rubber or a plastic as the case may be, may adhere strongly to the glass fibers.

Thus, it is one object of the present invention to provide a novel class of silicone compounds having a hydrazone functional group thereon.

It is another object of the present invention to provide a process for producing a novel class of silicone compounds which have a hydrazone functional group thereon.

It is yet an additional object of the present invention to provide a novel class of silicone compounds which by themselves or in combination with other compounds are very effective flocculating agents for colloidal organic matter.

It is still another object of the present invention to provide a novel class of silicone compounds having a hydrazone functional group thereon which are very effective in bonding various natural and synthetic resins and rubbers to glass fibers and other types of silica containing material.

These and other objects of the present invention are accomplished by means of the invention disclosed below.

Summary of the invention

In accordance with the present invention, there is provided a novel class of silicone compounds having the formula, (1)
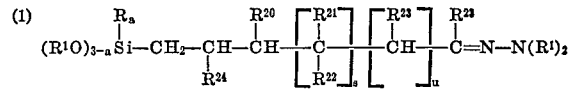

where R and $R^1$ are selected from the class consisting of monovalent hydrocarbon radicals and halogenated monovalent hydrocarbon radicals, $R^{20}$, $R^{21}$, $R^{22}$, $R^{23}$ and $R^{24}$ are independently selected from the class consisting of hydrogen, alkyl, cycloalkyl and aryl radicals of up to 10 carbon atoms, $s$ is a whole number that varies from 0 to 1, $u$ is a whole number that varies from 0 to 20 and $a$ is a whole number that varies from 0 to 2. In formula (1), $a$ is preferably 0, $R^1$ is preferably methyl or ethyl, $R^{20}$, $R^{23}$ and $R^{24}$ are preferably hydrogen.

DETAILED DESCRIPTION OF THE PREFERRED EMBODIMENT

The radicals R and $R^1$ are selected from monovalent hydrocarbon radicals and halogenated monovalent hydrocarbon radicals, that is, for example alkyl radicals, e.g., methyl, ethyl, propyl, butyl, octyl, etc. radicals; aryl radicals, e.g., phenyl, naphthyl, tolyl, xylyl, etc. radicals; aralkyl radicals, e.g., benzyl, phenylethyl radicals; alkenyl radicals, e.g., vinyl, allyl, cyclohexenyl etc. radicals; cycloalkyl radicals, e.g., cyclohexyl, cycloheptyl, etc. radicals; halogenated substituted monovalent hydrocarbon radicals such as, for example, chloromethyl, chloroethyl, dibromophenyl, etc. radicals and other similar types of hydrocarbon radicals.

The radicals $R^{20}$ and $R^{24}$ are preferably selected from hydrogen, alkyl, cycloalkyl, and aryl radicals of up to 10 carbon atoms. Examples of such radicals are alkyl radicals, such as methyl, ethyl, propyl, butyl and cycloalkyl radicals such as a cyclohexyl radical. The radicals R and $R^1$ are preferably methyl, ethyl, or propyl radicals. The symbol $a$ is a whole number that may vary from 0 to 2 and is preferably 0. The radicals $R^{21}$ and $R^{22}$ are preferably selected from hydrogen, alkyl, cycloalkyl radicals, aryl radicals of up to 10 carbon atoms. Preferably, $R^{21}$ and $R^{22}$ are alkyl radicals or cycloalkyl radicals such as methyl, ethyl, propyl, butyl, cyclopentyl and cyclohexyl.

The two radicals $R^{23}$ may be the same or different in the compounds within the scope of formula (1) as defined in the present invention. The radicals $R^{23}$ are preferably selected from hydrogen, alkyl radicals, cycloalkyl radicals and aryl radicals of up to 10 carbon atoms. Preferably, $R^{23}$ in both cases is hydrogen. However, the radicals $R^{23}$ in either case may be the same or different and are selected, more preferably, from alkyl radicals such as methyl, ethyl, propyl, butyl, etc. The symbol $s$ is a whole number that varies from 0 to 1 within the scope of formula (1). In the definition of one type of preferred compounds within the scope of the present invention, the symbol $s$ is preferably 1. The symbol $u$ is a whole number that varies from 0 to 20. In one type of compound coming within the scope of formula (1), $u$ is preferably 0. However, within the scope of the synthesis that will be presented below as well as definition of compounds coming within the scope of formula (1), it is possible that $u$ may vary from 0 to 20. More preferably, the symbol $u$ varies from 0 to 10.

The most preferred compound within the scope of formula (1) has the formula, (2) 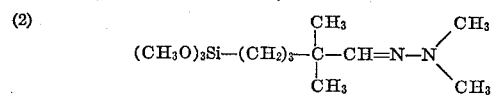

Other preferred compounds are:

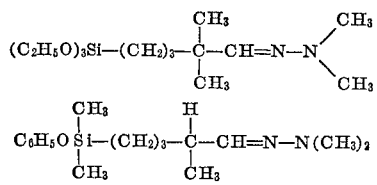

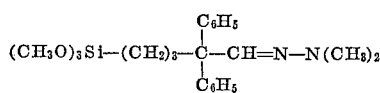

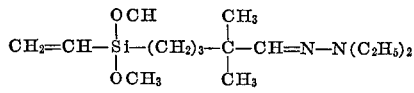

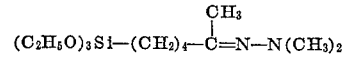

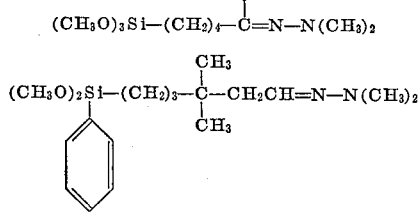

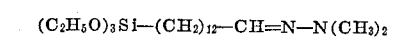

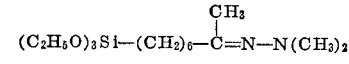

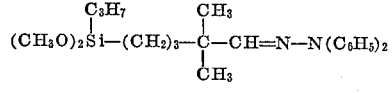

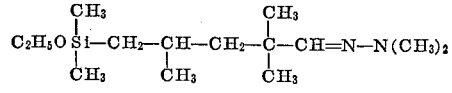

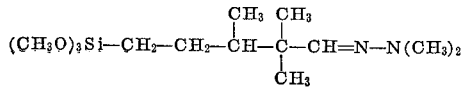

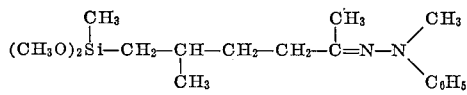

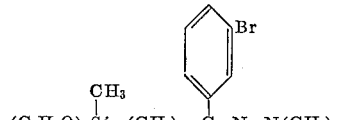

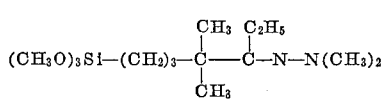

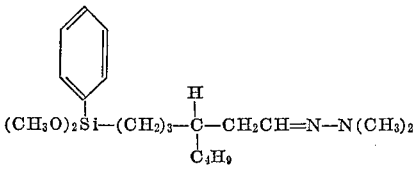

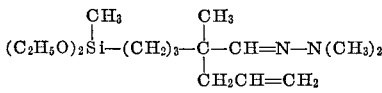

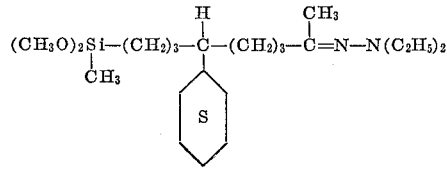

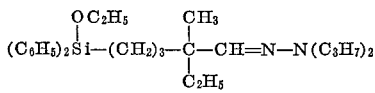

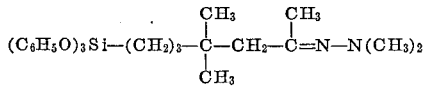

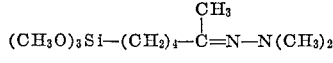

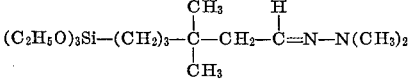

The novel class of compounds of the present invention within the scope of formula (1) are obtained by reacting a compound of the formula, (3) 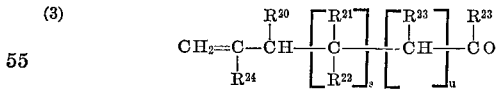

with a compound of the formula, (4) $\quad H_2N{-}N(R^1)_2$ to obtain a compound of the formula, (5) 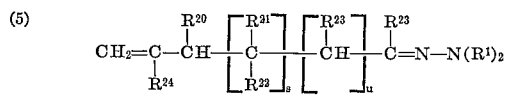

The compounds coming within the scope of formula (3) are well known in the art and are sold by such manufacturing concerns as Aldrich Chemical Co., Milwaukee, Wisconsin and Dow Chemical Co., Midland, Michigan. Further, in the above formulas, the symbols $R^1$, $R^{20}$, $R^{21}$, $R^{22}$, $R^{23}$ and $R^{24}$, and the symbols $s$ and $u$ are as previously defined.

In the reaction of the compounds of formulas (3) and (4), it is preferred that the reactants be mixed and reacted with each other in stoichiometric proportions. Although an excess of either reactant may be used, no advantage is gained by using such an excess. The reaction is preferably carried out with a solvent, such that the water that is formed as a result of this condensation reaction of the compounds of formulas (3) and (4) mixes with the solvent to form an azeotrope so as to permit the removal of the water by a reflux process continuously. Thus, although the reaction mixture can be heated or decanted to remove the water in the absence of a solvent, it is preferred in the reaction mixture to use one of the common inert hydrocarbon solvents to form an azeotrope with the water given off so that the removal of the water can be carried out azeotropically in a well known manner. Such type of common hydrocarbon solvents that may be used are solvents such as methanol, ethanol, toluene, xylene, benzene, hexane, cyclohexane, etc. It should be noted, however, that with the use of a solvent in the reaction and in the refluxing of the azeotrope that is formed that the reaction can be normally carried to completion with 90 to 95% yield and above in a reaction period of 1 to 4 hours at a reaction temperature of 50 to 120° C. However, if a solvent is not used and the compounds of formulas (3) and (4) are reacted stoichiometrically then the reaction may take place in as little time as 15 minutes. However, as was pointed out previously, it is preferred to use an inert hydrocarbon solvent because it allows for the smooth removal of the water that is formed and as a result diminishes the amount of side reactions that may occur. The above reaction may be carried out in the absence of a catalyst and as a matter of fact it is preferred that a catalyst not be used in the reaction. However, Lewis acid type of catalyst may be used in the reaction to somewhat speed up the reaction process as well as maintain the desired high yield in the reaction period of one to four hours. Common types of Lewis acids are ammonium chloride, boron trifluoride, boron trichloride, magnesium bromide, zinc chloride, aluminum chloride, iodine, etc. If a Lewis acid type of acid is used then it is preferable that this Lewis type of acid be used in a concentration of 0.2 to 3% by weight of the reactants of formulas (2) and (3). If the catalyst concentration is below 0.2 weight percent then the catalyst does not have any noticable effect on the reaction. If the catalyst concentration exceeds 3% by weight of the reactants then not only is the excess catalyst not necessary but further the excess catalyst may interreact with one of the reactants of formulas (3) and (4).

One novel class of compounds within the scope of the present invention is a reaction product of the reactants of formulas (3) and (4) which comes within the scope of the compounds of formula (5) above. This novel compound of formula (5) above may now further be reacted to produce compounds coming within the scope of formula (1). Thus, the compound of formula (5) above is reacted with a compound of the formula, (6) 

In formula (6), the radical R has the same meaning as defined previously. It should be mentioned that compounds coming within the scope of formula (6) are well known in the art and are manufactured by any of the well known manufacturers of silicone compounds in the world.

The compound of formula (6) is obtained by taking a compound of the formula, (7) 

in which formula, Z is equal to halogen and taking the above compound and reacting it with an alcohol or methylorthoformate. Preferably, the compound of formula (7) is reacted with an alcohol having the basic formula, $R^1OH$, where $R^1$ is as defined previously or a formate such as $(R^1O)_3CH$. The alcohol is mixed with the compound of formula (7) in stoichiometric proportions and vacuum is applied to the system while maintaining a reaction temperature of 60 to 120° C. The vacuum is applied to the system to remove the hydrogen chloride that is formed so that the hydrogen chloride will not interreact with the resulting compound that is formed. Of course, it may be appreciated that it is well known in reactions of this type that the alcoholysis may be carried out in a solvent in which hydrogen chloride is not soluble such as xylene and toluene which allows for the appropriate removal of the hydrogen chloride that is formed and so as to obtain the desired product of formula (5). Where a formate such as trimethylorthoformate is used, the HCl is not generated and an HCl acceptor is not necessary.

The reaction between the compounds of formulas (5) and (6) must be carried out in the presence of a platinum catalyst. This is an SiH-olefin addition reaction which is normally carried out in the presence of a platinum catalyst where the reactants are present in stoichiometric proportions. Although, the reactants may be present in excess no advantage is obtained by the use of an excess of a reactant. This reaction between the compounds of formulas (5) and (6) may be carried out at room temperature. However, the reaction may be anywhere from room temperature to 200° C. Further, the reaction may take place in the presence of an inert hydrocarbon solvent although such an inert hydrocarbon solvent is not required. Examples of such inert hydrocarbon solvents are xylene, toluene, benzene, cyclohexane and hexane. However, a hydrocarbon solvent is not really necessary in this reaction and the only purpose which it serves is to allow better mixing and contact between the reactants.

The platinum compound catalyst can be selected from the group of platinum compound catalysts which catalyze the addition of silicon hydrogen bonds across the olefinic bonds. Among the many useful catalysts for the addition reaction are chloroplatinic acid described in U.S. Pat. 2,823,218—Speier et al, the reaction product of chloroplatinic acid with either an alcohol ether or an aldehyde as described in U.S. Pat. 3,220,972—Lamoreaux, trimethyl platinum iodide and hexamethyldiplatinum as described in U.S. Pat. 3,313,773—Lamoreaux, the platinum olefin complex catalyst as described in U.S. Pat. 3,159,601—Ashby and the platinum cyclopropane catalyst described in U.S. Pat. 3,159,662—Ashby.

The SiH-olefin reaction may be run at room temperature as pointed out previously and although it is preferred to maintain the reaction temperature below 100° C. for practical purposes, it should be noted that the reaction may be operated as high as 200° C. depending upon catalyst concentration. Catalyst concentration can vary from $10^{-7}$ to $10^{-3}$ and preferably $10^{-5}$ to $10^{-4}$ mole of platinum as metal per mole of the olefinic molecules present.

Compounds within the scope of formula (3) are known in the art and are sold, for instance, by Aldrich Chemical Co., Milwaukee, Wisconsin. Such compounds may be synthesized, for instance, that is compounds within the scope of formula (3), where $s$ is equal to 0 and $u$ is equal to 1 by reacting an allyl alcohol with acetone in accordance with the following reaction, I. 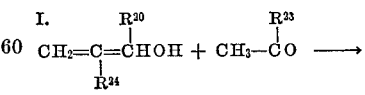

(8) 

where $R^{23}$ is equal to hydrogen. This reaction is preferably carried out in a temperature range of 50-250° C. The reaction is autogenously carried out, that is, the reaction is carried out at the pressure which the reactants develop during the course of the reaction. The reactants are preferably mixed in stoichiometric proportions and in the absence of a solvent. During the course of the reaction, it is usual that a pressure of 20 to 100 p.s.i.g. develop in the reaction chamber. In this reaction it is also necessary that a catalyst be used which is selected from strong organic sulfuric acids. Example of such a catalyst is toluene sulfonic acid which is used at a concentration of 0.2 to 4.0 percent by weight of the reactants. Preferably, the concentration of the catalyst is 0.2 to 2% by weight of the two reactants. As mentioned previously, a solvent is not necessary in the above reaction. However, if desired, a solvent may be used.

Using a similar type of reaction, a compound may be obtained within the scope of formula (3), where $s$ is equal to 1 and $u$ is equal to 0, and in addition $R^{23}$ is equal to hydrogen. Such a reaction is as follows:

II.
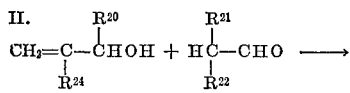

(9)

The reaction products within the scope of formula (8) of reaction I, and the reaction products within the scope of formula (9) of reaction II, may be further utilized in accordance with the Darzen's Glycitic Ester Synthesis to produce other compounds within the scope of the compounds of formula (3), that is, compounds where, for instance, $s$ is equal to 1 and $u$ is equal to 5, or compounds where $s$ is equal to 0 and $u$ is equal to 10. A detailed explanation of the Darzen's Glycitic Ester Synthesis is presented in the following publications: E. P. Blanchard, Jr. and G. Buchi, *J. Am. Chem. Soc.* 85, 955 (1963); J. D. Roberts, *J. Am. Chem. Soc.*, 73, 2959 (1951); and G. Darzens, *Compt. Rend.* 203, 1374 (1936), which publications are hereby incorporated into this application by reference.

The reaction conditions for reaction II above are quite similar to the reaction conditions for reaction I above, thus, it is preferable in reaction II above, that the reactants be reacted in stoichiometric proportions in an autoclave preferably in the presence of an inert hydrocarbon solvent such as methanol, xylene, toluene, benzene, mineral spirits and cyclohexane and the reaction be carried out autogenously at a pressure of 20 to 100 p.s.i.g. in a temperature range of 50° to 250° C. As in reaction I, it is preferred that an organic sulfonic acid be used as a catalyst. One example is that of toluene sulfonic acid and it is also preferable that this catalyst be used in the same concentrations in reaction II, as was used in reaction I.

To illustrate the Darzen's Glycitic Ester Synthesis, there may be taken, for instance, the compound of formula (8) in reaction I above, and be reacted with tertiary butyl chloroacetate and sodium amide with liquid ammonia as a solvent. This reaction of tertiary butyl chloroacetate is reacted in a 1:1 mole ratio with a compound of formula (8) and with molar amounts of sodium amide. The reaction is preferably carried out at −33° C. when liquid ammonia is used as the solvent but when no solvent is used the reaction can be carried out at elevated temperatures such as above 50° C. The product of this reaction is the glycidic ester which is isolated by well known procedures as mentioned in the above publications. The isolated glycidic ester product is then taken and pyrolized in a temperature range of 120 to 150° C. to obtain a product of the formula,

(10)
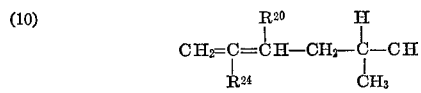

The compound of formula (10) which is an aldehyde as is the compound of formula (9), may then be taken and reacted with tertiary butyl hypochlorite in the absence of a solvent at a temperature preferably below 50° C., and more preferably in the temperature range of −10 to 20° C., so as to substitute the hydrogen atom of the aldehyde group with a chlorine atom to obtain a product of the formula,

(11)
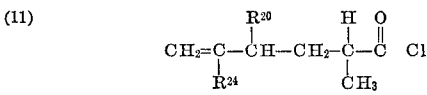

The compound of formula (11) may now be reacted with an alkyl cadmium chloride compound of the formula,

(12)         $R^{23}$ Cd Cl in which reaction the $R^{23}$ radical is as defined previously. The cadmium compound of formula (12) substitutes the $R^{23}$ radical for the chlorine atom in the compound of formula (11). This is a well known reaction as well as the chlorination of the aldehyde group and for further information of this reaction, one is referred to the following publication: D. Ginsburg, *J. Am. Chem. Soc.*, 73, 702 (1951). The disclosure of this reference is incorporated into this case by reference.

The reaction between the compounds of formula (11) and (12) is preferably carried out anywhere from room temperature to 100° C. in the presence of an inert hydrocarbon solvent such as toluene, xylene, mineral spirits and other such types of solvents. It is preferred that the compound of formula (12) be considerably in excess such as 50% to 100% in excess in comparison to the compound of formula (11). This reaction must be carried out anhydrously and as is well known a catalyst is not required.

The following examples illustrate the preferred embodiments of the present invention, but such examples are not intended to limit the scope of the invention in any way.

EXAMPLE 1

There is combined at once a solution of 173 g. 2,2-dimethyl-4-pentenal (1.77 moles), and 106 g. N,N-dimethylhydrazine in 250 ml. dry benzene. The mixture is brought to reflux such that the water is removed azeotropically as it is formed. When water is no longer collected in the Dean-Stark trap, the product is fractionated. There is obtained a 95% yield of a product (b.p. 55°/12 mm. vapor phase chromatography purity 99%).

To 22 g. of the above hydrazone containing compound there is added 2 drops of Lamoreaux platinum catalyst and the mixture is heated to 120–130° C. and to it there is added slowly 19.3 g. of trimethoxysilane. No reaction was evident. It is then brought to reflux at 145° C. After about 2 hours, gas chromatography indicated an adduct is being formed. An additional 2 drops of platinum catalyst solution is added and the reaction maintained at reflux. After 42 hours the reaction is about 75% complete. It is terminated and the reaction solution is fractionated. The yield of product b.p. 127°/8 mm. is 60%. Both infrared and nuclear magnetic resonance spectra are consistent with the product structure.

The product has the structure:

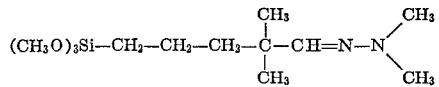

EXAMPLE 2

There is combined at once 98 g. (1.0 mole) of allylacetone, 60 g. (1.0 mole) of N,N-dimethylhydrazine and 200 ml. of benzene. The mixture is heated to reflux and water removed via its benzene azeotrope. When water is no longer collected in a Dean-Stark trap, the products are isolated by fractional distillation in 92% yield. The purity of this product is greater than 98% by gas chromatography.

To 70 g. (0.5 mole) of the above hydrazone compound there is added 4 drops Lamoreaux platinum catalyst and the mixture is heated to 80° C. To this warm mixture is added slowly 61 g. of (0.5 mole) of trimethoxysilane. An immediate reaction is observed as the reaction temperature increases to a maximum of 125° C. Following the addition, the reaction mixture is heated at 130° C. for one hour, then distilled under vacuum to yield the desired adduct. Both infrared and nuclear magnetic resonance spectra are consistent with the product structure.

The product has the structure:

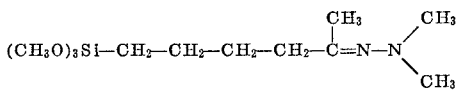

EXAMPLE 3

In a suitable flask is combined 112 g. (1.0 mole) of 2,2-dimethyl-4-pentenal, 120 g. (1.0 mole) of ethyl chloroacetate, and 200 ml. of dry benzene. During a period of 2 hours, 47.2 g. (1.2 moles) of finely powdered sodium amide is added to the mixture while the temperature is kept at 15° C. Following the addition, the reaction mixture is stirred for 2 hours at room temperature, then poured into a beaker containing 700 g. of cracked ice.

This intermediate glycidic ester is recovered from the ice-water mixture by decantation and is combined with a solution of 60 g. (1.5 mole) of sodium hydroxide in 300 ml. of water. The solution is stirred for 8 hours at 50° C. then acidified to congo red. The resulting glycidic acid is extracted with benzene and is then steam distilled using superheated steam at 180° C. Decarboxylation occurs and 3,3-dimethyl-5-hexenal is recovered over a period of 3 hours.

Upon combining 50.4 g. (0.4 mole) of 3,3-dimethyl-5-hexenal with 24 g. (0.4 mole) of N,N-dimethylhydrazine in a flask, water separation is observed upon standing for a period of 6 hours. The resulting hydrazone is recovered by decantation and then is purified by distillation under vacuum.

To 16.8 g. (0.1 mole) of the above hydrazone is added one drop of Lamoreaux platinum catalyst and 16.4 g. (0.1 mole) of triethoxysilane. The mixture is heated to reflux for a period of 12 hours during which time the reaction temperature rises to 185° C. Fractional distillation under vacuum produces a clear, colorless liquid whose infrared and nuclear magnetic resonance spectra are consistent with the following structure:

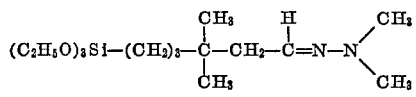

EXAMPLE 4

As in Example 1, there is combined 268 g. (2.0 mole) of 2-methyl-2-allyl-4-pentenal and 120 g. (2.0 mole) of N,N-dimethylhydrazine in 400 ml. of dry benzene. The mixture is refluxed for a period of 4 hours removing water via its azeotrope. When water is no longer collected in the Dean-Stark trap, the product is recovered by fractional distillation. The yield of purified hydrazone is 96% of theory.

To 180 g. (1.0 mole) of the above hydrazone is added 8 drops of Lamoreaux platinum catalyst and the resulting mixture is heated to 125° C. By means of an addition funnel, 134 g. (1.0 mole) of methyldiethoxysilane is added dropwise to the hydrazone solution while maintaining a temperature of 125–140° C. Following the addition, the reaction mixture is heated and stirred at 140° C. for 18 hours. The reaction is terminated and the silylhydrazone adduct is recovered by distillation under vacuum. The yield is 55% of theory. Infrared analysis is consistent with the product structure.

The product has the structure:

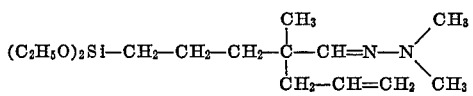

EXAMPLE 5

To 22.4 g. (0.2 mole) of 2,2-dimethyl-4-petenal in 80 ml. of carbon tetrachloride is added slowly 21.6 g. (0.2 mole) of t-butyl hypochlorite. Immediately after all the hypochlorite is added, the reaction mixture is distilled at reduced pressure to remove t-butanol and CCl$_4$. Fractional distillation of the remaining residue furnishes 2,2-dimethyl-4-pentenoyl chloride.

To an ether solution of 0.08 mole of diethyl cadmium cooled to 5° C. is added 21.9 g. (0.15 mole) of the above pentenoyl chloride. The addition is conducted in a dropwise fashion and upon completion the reaction mixture is hydrolyzed over crushed ice. The ether layer is recovered and dried over anhydrous sodium sulfate. Fractional distillation of this ethereal solution provides 13.6 g. of ethyl-1,1-dimethyl-3-butenyl ketone.

The above ketone is converted to the corresponding hydrazone by reaction with N,N-dimethylhydrazine according to Example 2. This hydrazone upon treatment with trimethoxysilane in the presence of Lamoreaux platinum catalyst produces a high yield of product having the structure:

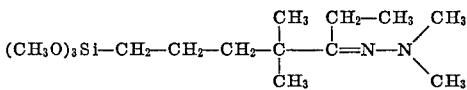

EXAMPLE 6

To a solution of 12.6 g. (1.0 mole) of 2,2,4-trimethyl-4-pentenal in 300 ml. of benzene is added 60 g. (1 mole) of N,N-dimethylhydrazine as a single portion. The mixture is brought to reflux such that the water is removed azeotropically as it is formed. When water is no longer collected in the Barrett trap, the mixture is fractionally distilled. There is obtained 85% of product.

To 16.8 g. (0.1 mole) of the above hydrazone product there is added 2 drops Lamoreaux platinum catalyst and 10.4 g. (0.1 mole) of dimethylethoxysilane (dropwise) while maintaining a temperature of 75° C. After one hour, gas chromatography indicated an adduct is being formed. An additional drop of platinum catalyst solution is added and the mixture maintained at reflux. After 32 hours, the reaction is essentially complete. Fractional distillation at reduced pressures provides the product in 88% yield. Infrared and nuclear magnetic resonance spectra are consistent with the product structure.

The product has the structure:

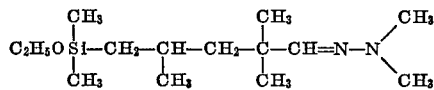

What is claimed is:
1. A compound of the formula,

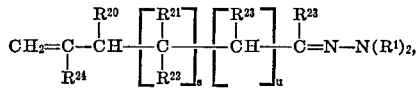

where $R^1$ is an alkyl radical, $R^{20}$, $R^{21}$, $R^{22}$, $R^{23}$ and $R^{24}$ are independently selected from the group consisting of hydrogen, and alkyl radicals, said alkyl radicals containing up to 10 carbon atoms, $u$ varies from 0 to 20 and $s$ varies from 0 to 1.

References Cited
FOREIGN PATENTS
1,109,473   4/1968   Great Britain.

BERNARD HELFIN, Primary Examiner
G. A. SCHWARTZ, Assistant Examiner

U.S. Cl. X.R.

Other pertinent disclosure adequately cross-referenced in parent, now U.S. 3,700,711.